(12) United States Patent
Lyon et al.

(10) Patent No.: US 9,621,768 B1
(45) Date of Patent: Apr. 11, 2017

(54) MULTI-VIEW MEDIA DISPLAY (75) Inventors: Barrett Gibson Lyon, Pacifica, CA (US); Brian Shalar, Mesa, AZ (US)

(73) Assignee: TATA COMMUNICATIONS (AMERICA) INC., Herndon, VA (US)

( * ) Notice: Subject to any disclaimer, the term of this patent is extended or adjusted under 35 U.S.C. 154(b) by 1592 days.

(21) Appl. No.: 12/316,119

(22) Filed: Dec. 8, 2008

(51) Int. Cl.
| | |
|---|---|
| H04N 5/77 | (2006.01) |
| H04N 5/00 | (2011.01) |
| H04N 13/04 | (2006.01) |
| H04N 5/225 | (2006.01) |
| H04N 5/222 | (2006.01) |

(52) U.S. Cl.
CPC ............. H04N 5/00 (2013.01); H04N 13/04 (2013.01); H04N 5/222 (2013.01); H04N 5/225 (2013.01)

(58) Field of Classification Search
CPC .. H04N 5/77; H04N 13/0048; H04N 13/0055; H04N 5/772; H04N 1/2112; H04N 5/907; H04N 2101/00; H04N 9/8048; H04N 5/765; H04N 7/181; H04N 17/06; G11B 27/105; G11B 2220/2541; G08B 13/19645; G08B 13/19667
USPC .................................................. 386/223–227
See application file for complete search history.

(56) References Cited

U.S. PATENT DOCUMENTS

| | | | | |
|---|---|---|---|---|
| 5,708,469 | A | * | 1/1998 | Herzberg ........................ 348/39 |
| 7,818,355 | B2 | | 10/2010 | Mills et al. |
| 2007/0030341 | A1 | * | 2/2007 | Morimoto ........................ 348/36 |
| 2007/0162945 | A1 | | 7/2007 | Mills |
| 2007/0218315 | A1 | * | 9/2007 | Taguchi et al. ................ 428/800 |
| 2008/0055416 | A1 | * | 3/2008 | Aoki ............................ 348/207.1 |
| 2008/0091845 | A1 | | 4/2008 | Mills et al. |
| 2008/0235200 | A1 | | 9/2008 | Washington et al. |
| 2009/0013414 | A1 | | 1/2009 | Washington et al. |
| 2009/0047004 | A1 | * | 2/2009 | Johnson et al. ............... 386/126 |
| 2010/0070608 | A1 | | 3/2010 | Hosur |
| 2010/0094931 | A1 | | 4/2010 | Hosur et al. |

* cited by examiner

*Primary Examiner* — Nigar Chowdhury
(74) *Attorney, Agent, or Firm* — Westerman, Hattori, Daniels & Adrian, LLP (57) ABSTRACT

Displaying media information includes receiving a first media stream that is encoded based at least in part on a plurality of recordings; displaying the first media stream, including simultaneously displaying a first main view and a first set of auxiliary views, the first main view corresponding to at least one of the plurality of recordings and at least some of the first set of auxiliary views corresponding to at least some of the plurality of recordings; receiving a user selection that corresponds to a selected one of the first set of auxiliary views; in response to the user selection, receiving a second media stream that is encoded based at least in part on at least some of the plurality of recordings; and displaying the second media stream, including simultaneously displaying a second main view and a second set of auxiliary views, the second main view corresponding to the selected one of the first set of auxiliary views and the second set of auxiliary views corresponding to at least some of the plurality of recordings.

47 Claims, 10 Drawing Sheets

MULTI-VIEW MEDIA DISPLAY

BACKGROUND OF THE INVENTION

Video viewers currently have limited control over the video images of the programs that are being played. Typically, a viewer of a TV program or a DVD recording is presented with the footages and camera angles selected by the producer of the program, which provides the viewer with very limited capabilities to interact with the program besides changing the speed at which the program is displayed. Some existing TV sets support a picture-in-picture function, which requires two TV tuners to supply a large picture and a small picture on the same screen. The viewer has some control over selecting which program to display but still lacks control over how each program is displayed. With the advent of Internet video, viewers have a greater range of content to choose from but still have very limited options to interact with material recorded by others.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Generating and displaying media streams with multiple views is described. A media stream is encoded to include audio visual data as well as other types of recorded information and can be played over a period of time using an appropriate media player. In some embodiments, media streams are generated based on multiple recordings. In the examples described below, a media stream is encoded to display multiple views based on multiple recordings; therefore, it is referred to as a multi-view stream. A user can control the display of multi-view streams via a media player that includes control interfaces.

Figure 1:
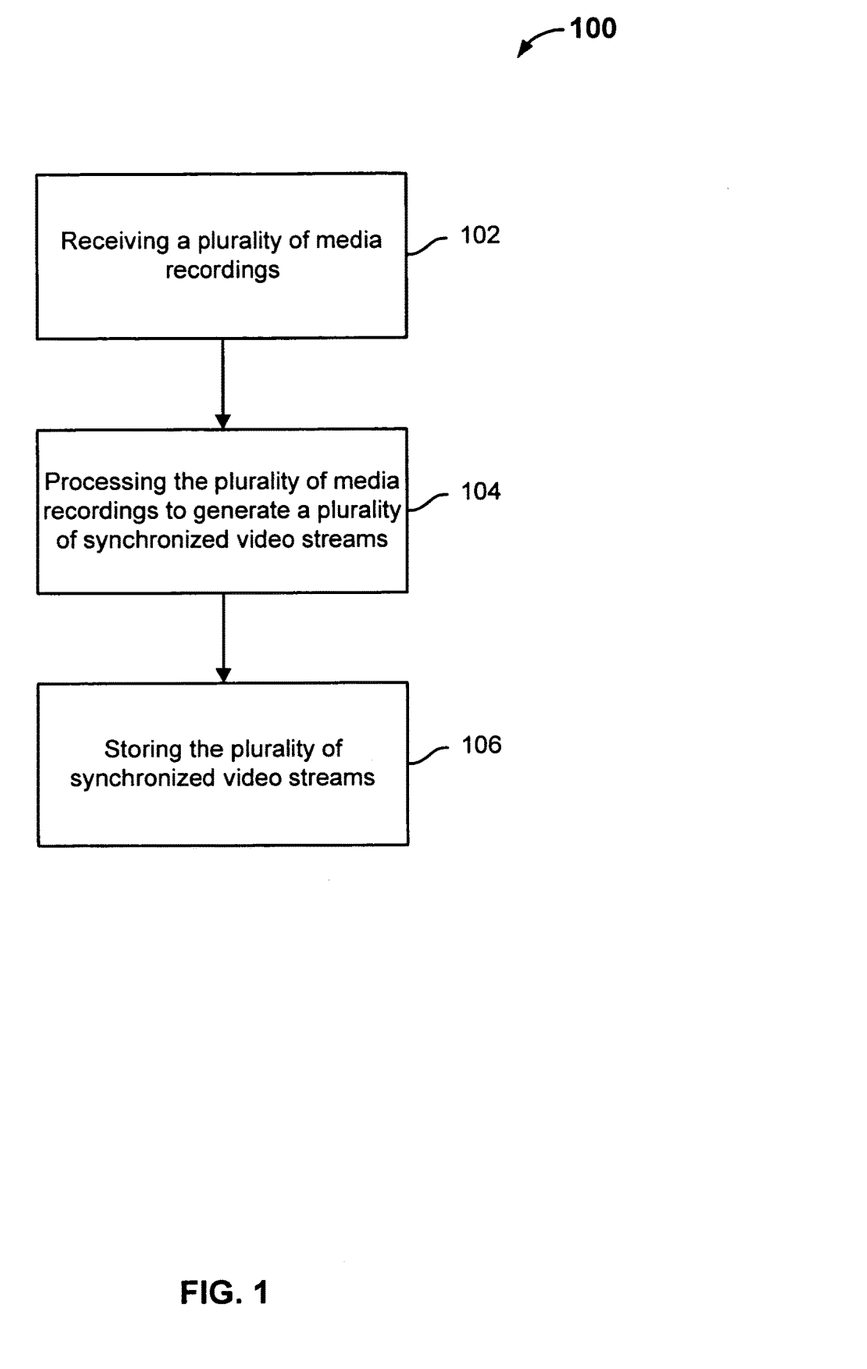
FIG. 1 is a flowchart illustrating an embodiment of a process for generating multi-view media streams.

FIG. 1 is a flowchart illustrating an embodiment of a process for generating multi-view media streams. Process 100 may be implemented on a general purpose processor, a specialized video processor, an application specific integrated circuit (ASIC), or any other appropriate processing component. At 102, a plurality of media recordings is received. The media recordings may include audio, video, or other types of recorded data. In some embodiments, live recordings that are captured in real time are received. In some embodiments, the recordings have been previously captured and stored and are sent to the processing device upon request. At 104, the media recordings are processed to generate a plurality of synchronized media streams. In some embodiments, each of the synchronized media streams, when displayed, includes multiple views generated based on the plurality of media recordings received. In some embodiments, a media stream includes information for displaying one of the media recordings in a main view and other media recordings in one or more auxiliary views. At 106, the synchronized media streams are stored in one or more storage devices as files and may be accessed by local or remote client applications such as media players. In some embodiments, the generated media streams are sent in real time to one or more client applications.

Figure 2A:
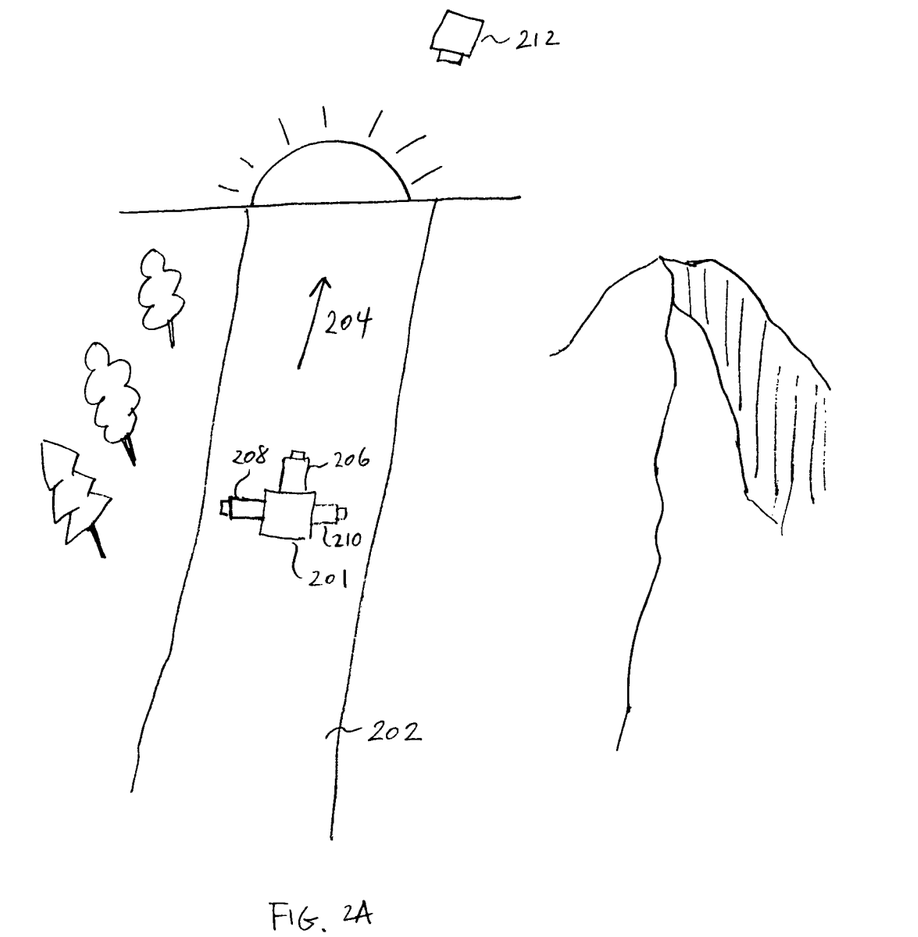
FIG. 2A is a diagram illustrating an example scenario in which recordings are made.

FIG. 2A is a diagram illustrating an example scenario in which recordings are made. In this example scenario, a vehicle 201 is moving along a road 202 in the direction of arrow 204. Three recording devices 206, 208, and 210 (such as video cameras or the like) are mounted on the vehicle. Recording device 206 faces the direction of the sun and captures a video footage of the sunrise as vehicle 201 moves along the road. Recording device 208 captures the scene to the left of the vehicle, which in this case is the scenery of a forest. Recording device 210 captures the view to the right, which in this case is the scenery of a mountain range. Separately, another recording device 212 is mounted on an ultralight plane flying overhead at the same speed as the vehicle, capturing a bird's-eye view of the scenery below. Thus, a total of 4 video recordings (the sun, the forest, the mountain range, and the bird's-eye view) are captured. Although an example involving four video recordings of different camera angles is discussed extensively for purposes of illustration, the number of recordings and the content that is captured by the recording devices may vary in different embodiments. In some embodiments, different types of recording, devices are used to capture different types of information. For example, infrared or 3D cameras are used in some embodiments instead of or in conjunction with regular video cameras. These different types of recording devices may capture data at approximately the same camera angle or at different ones.

In some embodiments, a synchronization event is used to synchronize the recordings. For example, the sounding of a horn is sometimes used since the loud sound creates an audio spike in all of the recordings. When the recordings are processed, the audio spike is located and used to synchronize the recordings to the same start time. In some embodiments, the recording devices communicate with each other and perform synchronization internally. In some embodiments, the recording devices can be synchronized to the same clock, and the recordings are automatically synchronized based on the same starting time. The recordings may be processed in real-time or saved as video files and stored for post-processing.

Figure 2B:
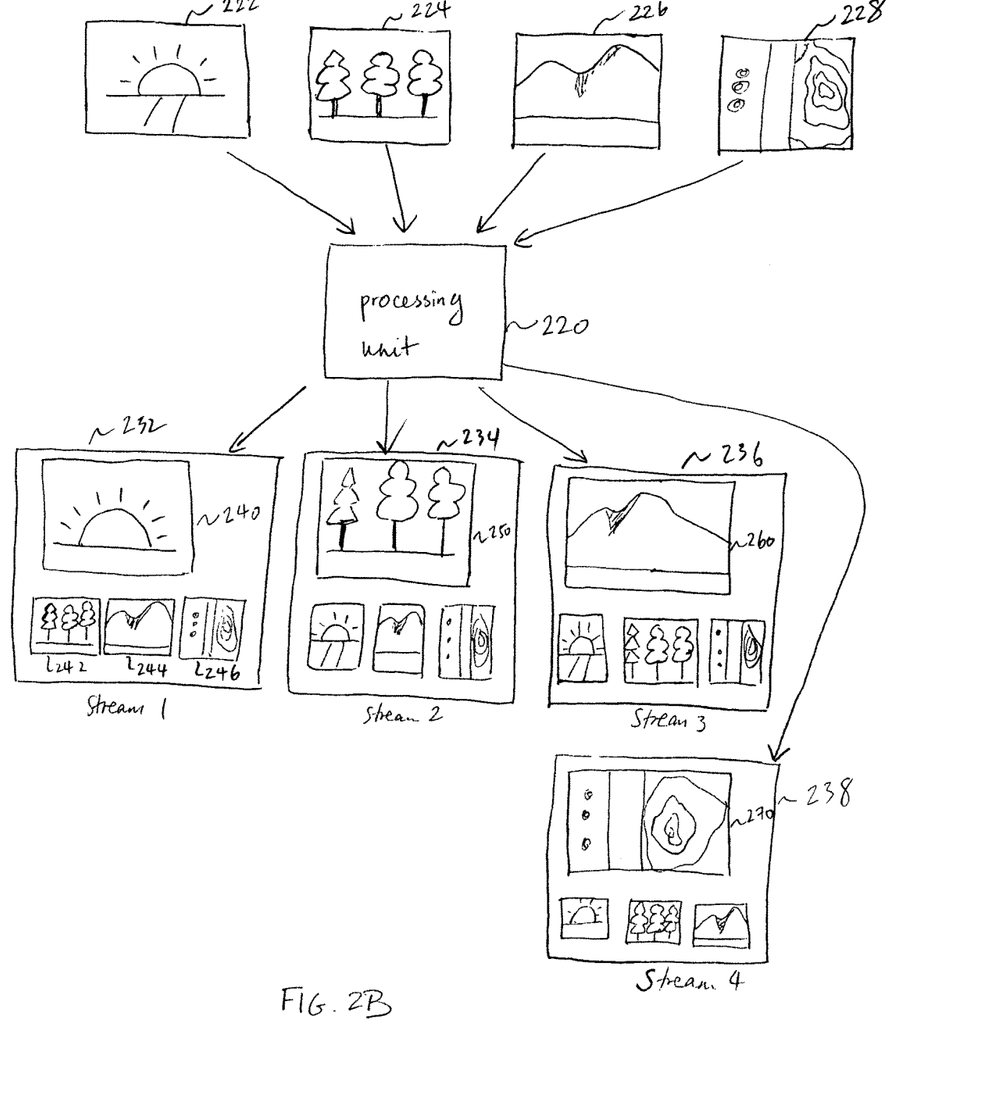
FIG. 2B is a diagram illustrating an example system for processing the media recordings captured in the example of FIG. 2A.

FIG. 2B is a diagram illustrating an example system for processing the media recordings captured in the example of FIG. 2A. In this example, video recordings 222 (sun), 224 (forest), 226 (mountain), and 228 (bird's-eye view) are received by a processing unit 220 via one or more appropriate communication interfaces. The technique described below is also applicable to other recording and media types. In embodiments where the processing unit 220 is configured to perform post-processing, it receives the video recordings by reading video recording files from their storage locations. In embodiments where the processing unit is configured to perform real-time processing, it receives the recordings in real-time as the recording devices are capturing the recordings. The processing unit encodes the video recordings and generates media streams 232, 234, 236, and 238. Many encoding techniques are possible. In the example shown, the recordings are encoded to generate a media stream formatted and saved as a Flash video file (FLV file), which can be displayed using a media player such as a standard or customized Flash player. In this example, each media stream is encoded to include information for displaying a main view and a plurality of auxiliary views. For example, when media stream 232 is played by a media player, main view 240 shows the sunrise view that corresponds to video recording 222, and views in a set of auxiliary views 242, 244, and 246 display footages that correspond to forest video 224, mountain video 226, and bird's-eye view video 228, respectively. The number of auxiliary views in the set depends on the implementation and can be one or more in various embodiments. The main view occupies a greater area of the display and shows the video in greater detail. The auxiliary views serve as "thumbnails" of the other recordings and are displayed at lower resolution. Similarly, in media streams 234, 236, and 238, main views 250, 260, and 270 display videos that correspond to recordings 224 (forest), 226 (mountain), and 228 (bird's-eye view), respectively. In each media stream, the auxiliary views display thumbnail views of other video not shown in the main view. In some embodiments, a thumbnail version of the recording displayed in the main view is also optionally displayed as one of the auxiliary views.

Figure 2C:
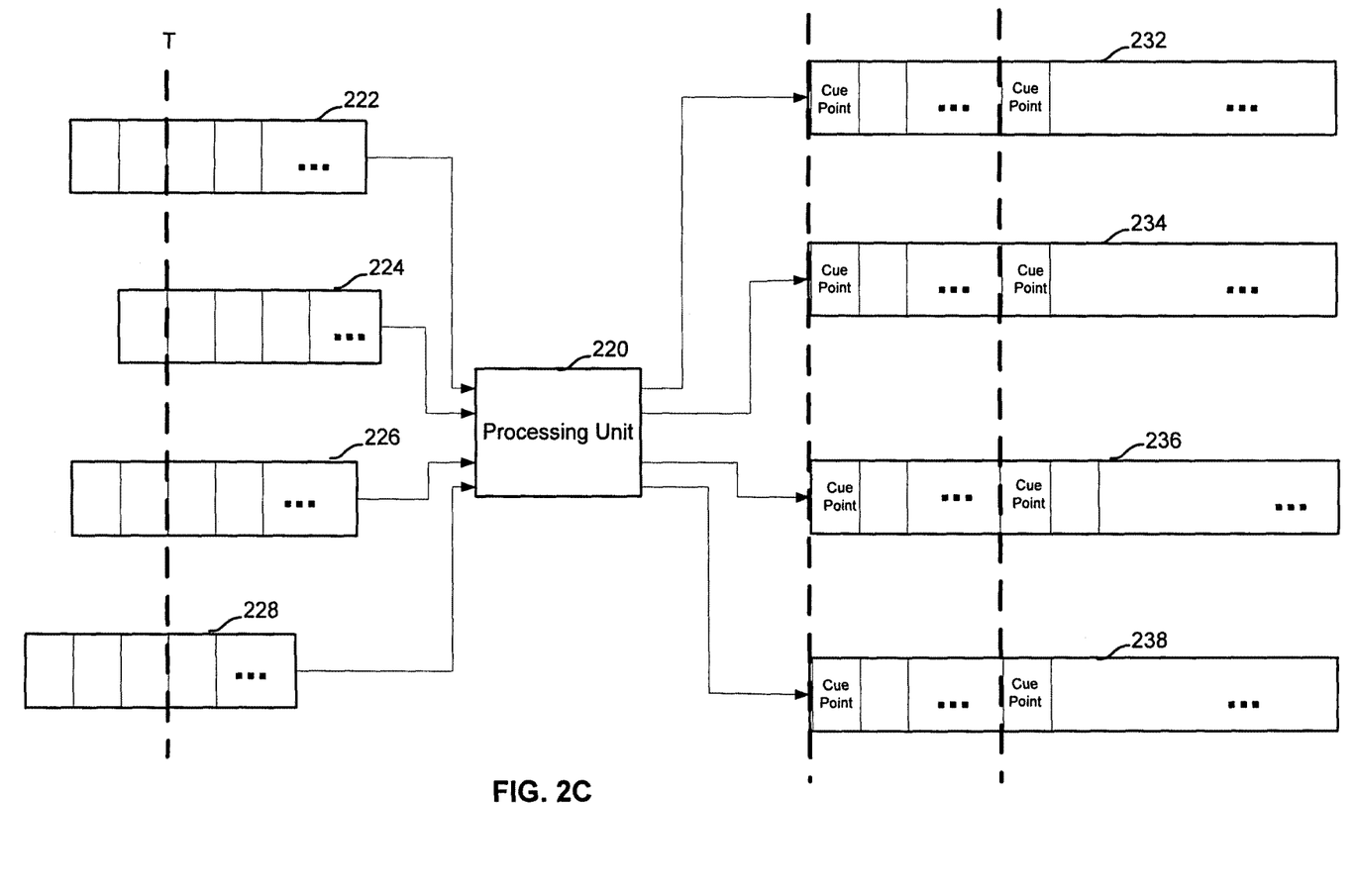
FIG. 2C is an embodiment of a file level diagram of the system shown in FIG. 2B.

FIG. 2C is an embodiment of a file level diagram of the system shown in FIG. 2B. Aspects of the file formats of the recordings and the generated streams are shown in this example. Recordings 222-228 each include a series of video frames. Frames from different recordings are aligned at time T where a synchronization event took place. Processing unit 220 receives the recordings via one or more appropriate interfaces by reading from stored files or by getting them in real-time while data is captured by the recorders. The processing unit encodes the recordings into appropriate media formats and combines the encoded recordings to generate media stream files 232-238, which in this case are formatted as Flash video files. As shown previously in FIG. 2B, each media stream is encoded as a stream that displays a main view and three auxiliary views. In this example, the processing unit also injects cue points into the media streams at key frames in the Flash video files. Cue points are points within a Flash video that include information and provoke events in Flash code. For example, a cue point can sometimes be used to facilitate the playback of the video content. In this example, the cue points are used to synchronize the media streams and make image transitions smoother. In some embodiments, metadata information such as Global Positioning System (GPS) coordinates, vehicle speed, camera location information, video quality information, etc., is saved along with the Flash video files. In some embodiments, the metadata information is saved as part of the headers of the video files. In some embodiments, the metadata information is saved as Extensible Markup Language (XML) data, JavaScript Object Notation (JSON) data, or any other appropriate data formats.

Figure 3:
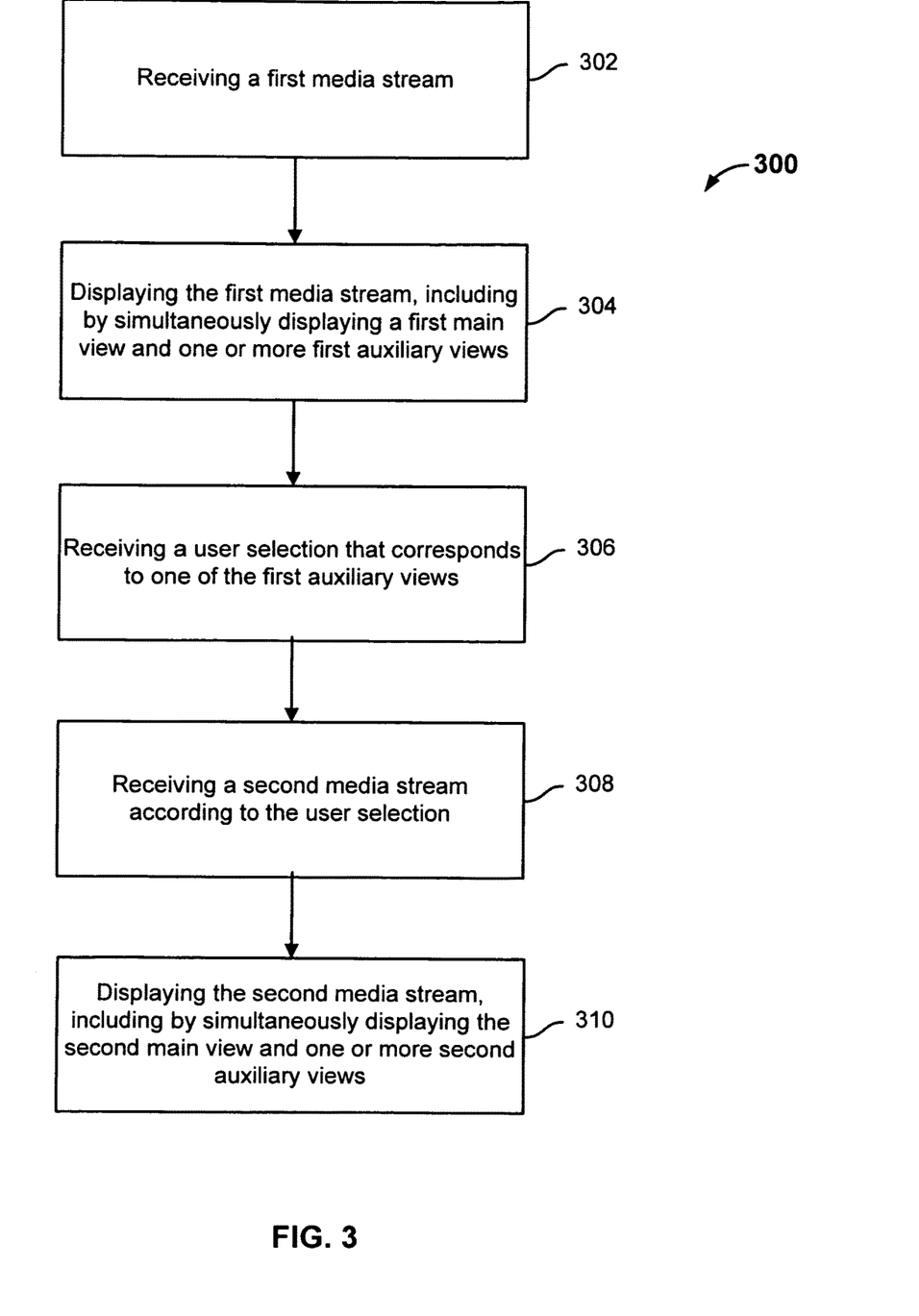
FIG. 3 is a flowchart illustrating an embodiment of a process for displaying media streams.

FIG. 3 is a flowchart illustrating an embodiment of a process for displaying media streams. Process 300 may be implemented on a client device such as a computer that includes a media player configured to play media streams. In some embodiments, the media player comprises an embedded media player in a website accessed by the client. In some embodiments, the media player comprises a Flash player with customized features such as embedded user selectable areas and a two-dimensional scrubber bar. At 302, a first media stream is received. In some embodiments, the media stream is received when the user's media player makes a request for a media file and a server responds by sending the requested media file. In some embodiments, the first media stream is received on an interface configured to communicate with a processor that executes media player code. The media player parses the received media stream. At 304, the first media stream is displayed by the media player. As shown previously in FIG. 2B, the first media stream is displayed in a display area that includes a main view and a set of auxiliary views. These views are displayed simultaneously. At 306, a user selection that corresponds to one of the first auxiliary views is received. The user selection is received on an appropriate interface and passed on to the processor. In some embodiments, the media player is configured with user selectable portions that allow the user to select a different view than the one that is being displayed. When a user selection is made, a request is sent from the client to the server, requesting the server to stop sending the first media stream and to begin sending the second media stream. At 308, a second media stream is received according to the user selection. At 310, the second media stream is displayed by the media player, which presents a second main view and a second set of auxiliary views in the same display area. The second main view displays the content of the first auxiliary view that was selected at 306, and the content of the first main view is now displayed as one of the second auxiliary views. In this example, the media player only requires a single stream to be opened and received at one time. From the user's perspective, however, it appears as though multiple media streams were opened simultaneously in the player. Thus, displaying a single stream with multiple views provides the same user experience as displaying multiple streams each showing a single view, but at a lower bandwidth requirement.

Figure 4A:
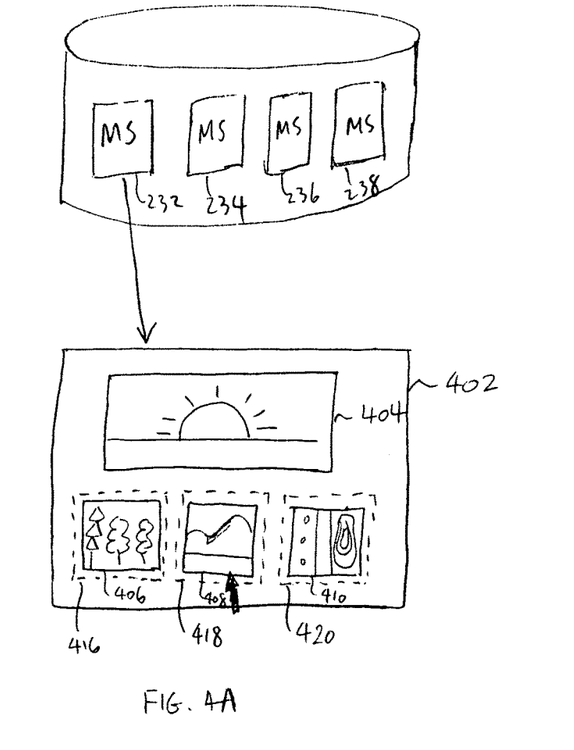
FIGS. 4A and 4B are diagrams illustrating an example process in which a user controls the display of media streams.
Figure 4B:
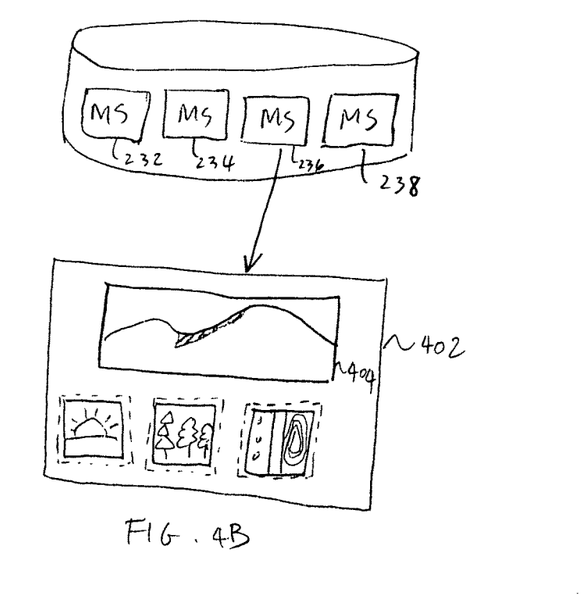

FIGS. 4A and 4B are diagrams illustrating an example process in which a user controls the display of media streams. FIG. 4A shows that on the server side, media stream files 232-238 are stored. Media stream 232 is displayed on a client side media player in a display area 402. The display area includes a main view 404 showing the sunrise and a set of auxiliary views 406, 408, and 410 showing the forest, the mountain, and the bird's eye view, respectively. In some embodiments, the auxiliary views comprise thumbnail views that can be selected. In this example, the auxiliary views overlap with user selectable areas 416, 418, and 420, which are shown with dashed lines for purposes of illustration but appear transparent to the user in actual implementation. The auxiliary views and the user selectable portions are implemented in separate layers, and the auxiliary views may overlay or underlay the user selectable portions depending on implementation. When the user wishes to see in the main view 404 a video from a different camera angle, he moves the cursor over the desired auxiliary view and selects this auxiliary view by clicking on it, in effect activating the underlying user selectable portion. The user selectable portion is programmed to generate a server request based on the user selection. In this example, the user selects auxiliary view 408 (mountain) by clicking in user selectable portion 418. The request generated based on the user selection indicates to the server that a media stream with the mountain video in the main view should be transferred to the client. Alternatively, some embodiments provide other interfaces for making a user selection, including links or radio selection buttons. In FIG. 4B, the request has been received by the server, which has stopped sending media stream 232 and has started sending media stream 236 to the client. In main view 404, the video recording of the mountain range is displayed, and the video recordings of the sunrise, forest, and bird's-eye view are shown in the auxiliary views. The user can switch to viewing different video footages in the main view by clicking on a different auxiliary view and selecting the corresponding user selectable portion.

Figure 4C:
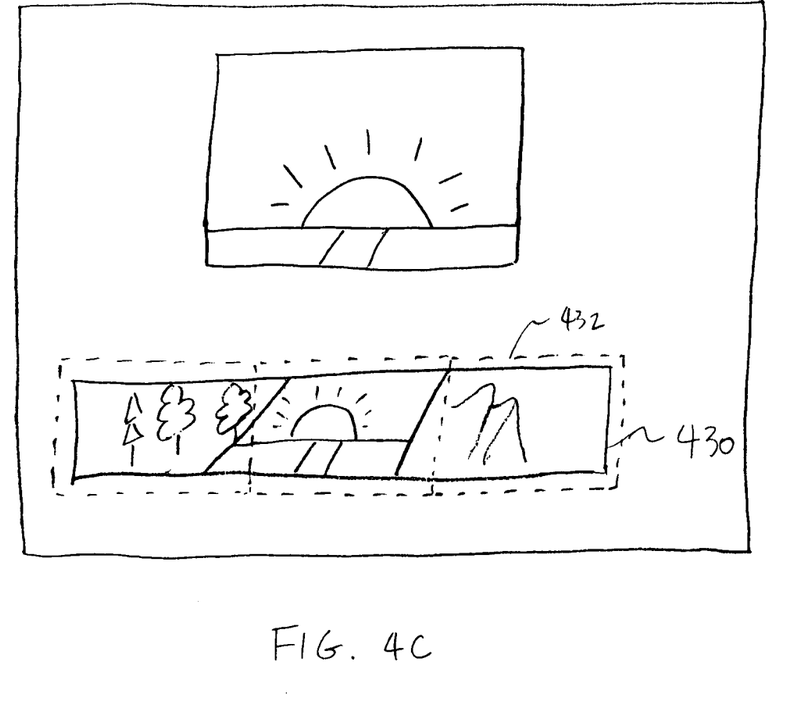
FIG. 4C is a diagram illustrating another media player interface example.

FIG. 4C is a diagram illustrating another media player interface example. As shown in this example, camera angles of the original recordings overlap, thus allowing the various views to be stitched together to provide a panoramic view 430. The user selectable portions corresponding to the auxiliary views are also connected, forming a user selectable region 432. The user can click anywhere on the panoramic view to cause a corresponding media stream to be displayed, in which a bigger, more detailed view of the selected region is shown as the main view. Many other user interface arrangements are possible in various embodiments. For example, in some embodiment's 3D and infrared recordings are captured and processed in addition to a regular video recording. The media player presents different types of content in separate views and allows the user to select among different views.

Figure 5A:
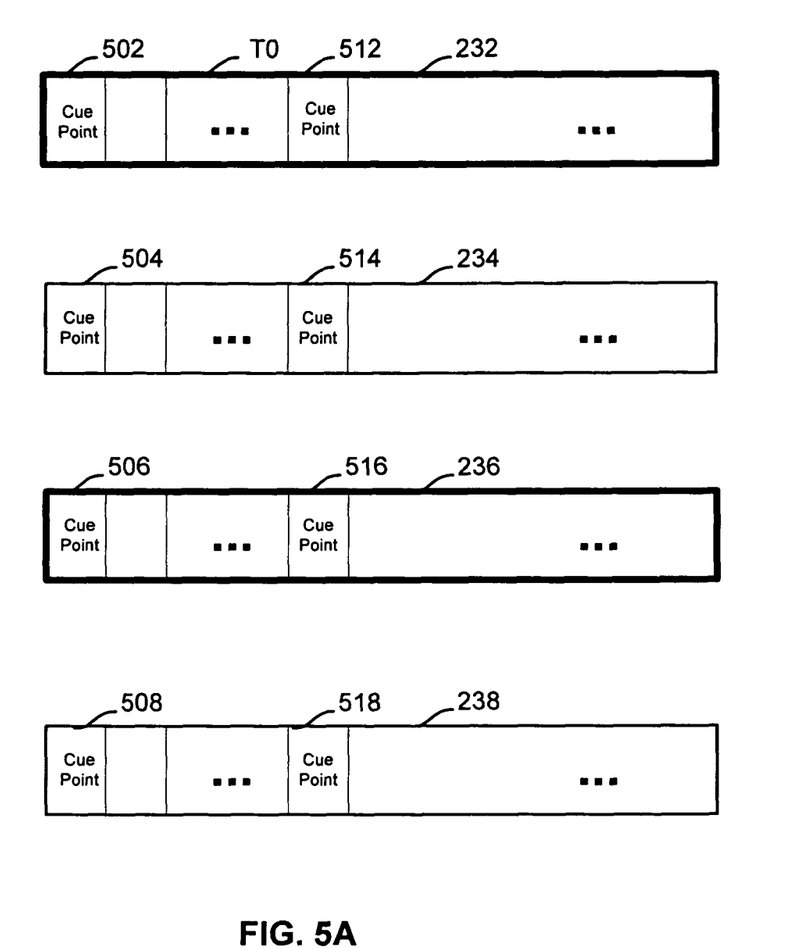
FIG. 5A illustrates examples of media file segments that include cue points.

In some embodiments, the media stream files include cue points to facilitate the transition between media streams. FIG. 5A illustrates examples of media file segments that include cue points. Media streams 232-238 are shown in this example. Each stream includes a number of video frames, and cue points are inserted at, for example, key frames 502 and 512 of stream 232, key frames 504 and 514 of stream 234, key frames 506 and 516 of stream 236, and key frames 508 and 518 of stream 238. In this example, the cue points are used to align the streams temporally and synchronize the streams. In other words, cue points 502-508 correspond to data captured at approximately the same time, and cue points 512-518 correspond to data captured at approximately the same time. Suppose media stream 232 (sunrise in the main view) is playing initially, and a user request is received at time T0, indicating that he wishes to switch to displaying media stream 236 (mountain in the main view). Since T0 is between two cue points 502 and 512, the server continues to send stream 232 to the client side media player, allowing stream 232 to continue to play until cue point 512 is encountered. Meanwhile, the media player requests stream 236, and the server starts to send frames beginning at cue point 516. When no more frames are received from stream 232, the media player switches to displaying frames in stream 236, starting at cue point 516. Alternatively, in some embodiments, streams 232 and 236 are displayed simultaneously for a period of time to achieve the effect of fading from one view into another. Switching media streams using cue points keeps streams synchronized and achieves a smoother transition. In some embodiments, cue points may be injected at prescribed byte offsets and/or time codes associated with the media streams.

Figure 5B:
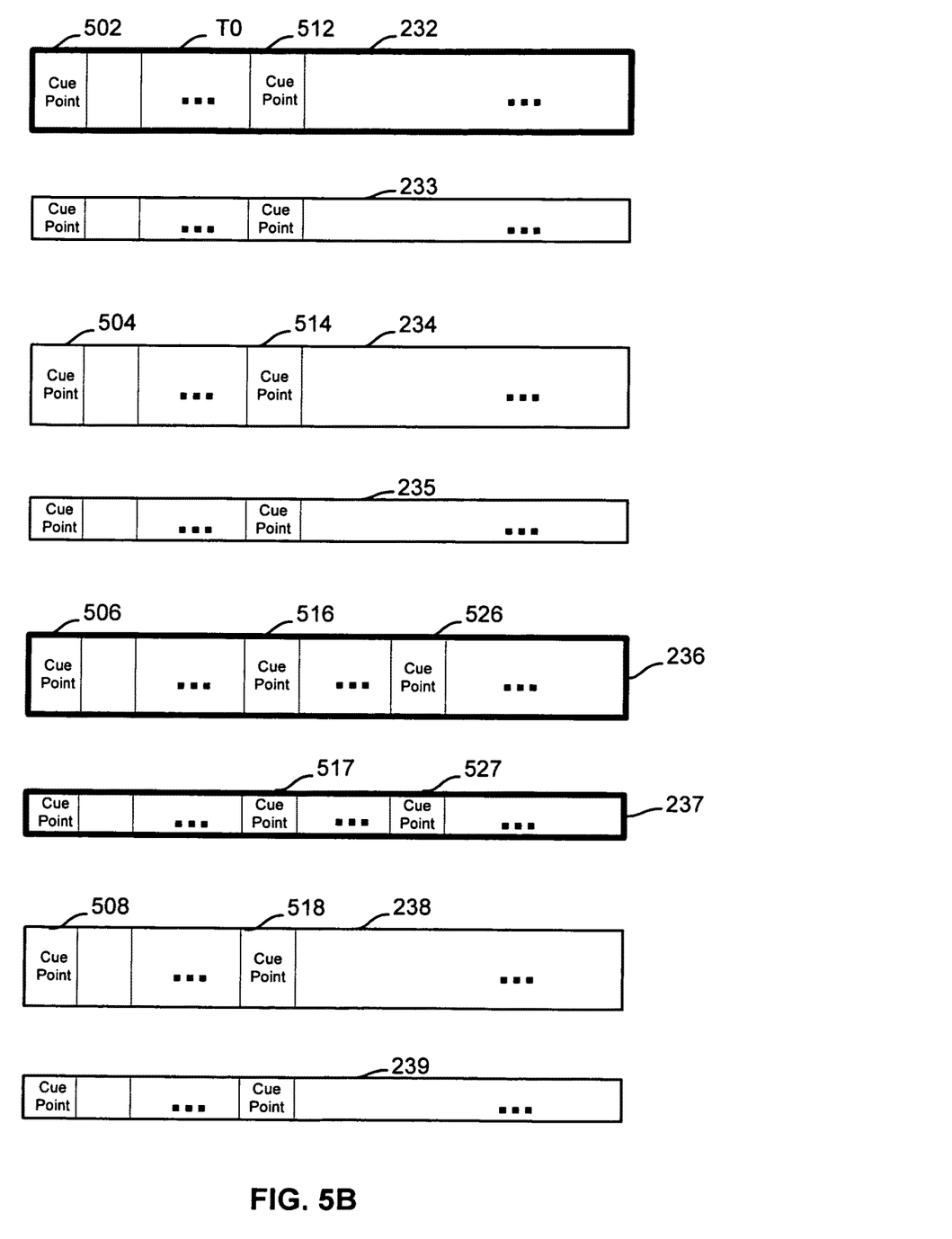
FIG. 5B illustrates an example in which media files of different quality are generated and used.

In some embodiments, media streams of different quality are generated and used. FIG. 5B illustrates an example in which media files of different quality are generated and used. In the diagram shown, four lower quality media streams 233, 235, 237, and 239 are generated in addition to media streams 232, 234, 236, and 238. Each of the lower quality media streams is encoded to display the same footage as its corresponding higher quality counterpart. Both the higher quality and lower quality streams are generated based on the same set of recordings. The lower quality stream can be sent from the server using less bandwidth than the higher quality stream. In other words, streams 232 and 233 both show the sunrise scene in the main view and the forest, mountain, and bird's eye view scenes in the auxiliary views, but the images in stream 233 have lower quality and require less bandwidth than stream 232. In some embodiments, when the user switches between streams, the media player first requests, receives, and displays a section of the lower quality stream and then requests, receives, and displays the higher quality stream. Again, suppose media stream 232 (sunrise in the main view) is displayed initially, and a user request is received at T0 to switch to displaying the mountain scene in the main view. The media player continues to display stream 232 until the frame that corresponds to cue point 512. In the meantime, the media player loads and displays a section of lower quality stream 237 between cue points 517 and 527. While the lower quality stream section is displayed, the media player loads higher quality stream 236 starting at cue point 526. Since a lower quality stream section can be loaded more quickly than the higher quality stream, using the lower quality stream section to fill in the display until the higher quality stream is loaded and buffered allows for smoother transitions between scenes.

Figure 6A:
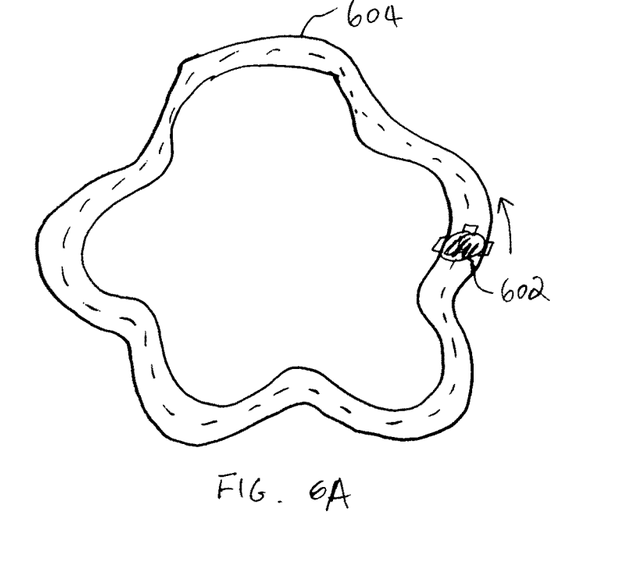
FIG. 6A is a map illustrating an example in which location information is recorded.

In some embodiments, the movements of the recording devices are recorded and used to program a control interface. FIG. 6A is a map illustrating an example in which location information is recorded. In this example, a vehicle 602 carrying multiple recorders is travelling along a path 604. Location information associated with the vehicle is recorded along with the video recording and synchronized. In some embodiments, GPS coordinates of the vehicle/recorders are taken periodically and stored. In some embodiments, the media streams store GPS coordinates along with cue points that correspond to the times the GPS coordinates are taken.

Figure 6B:
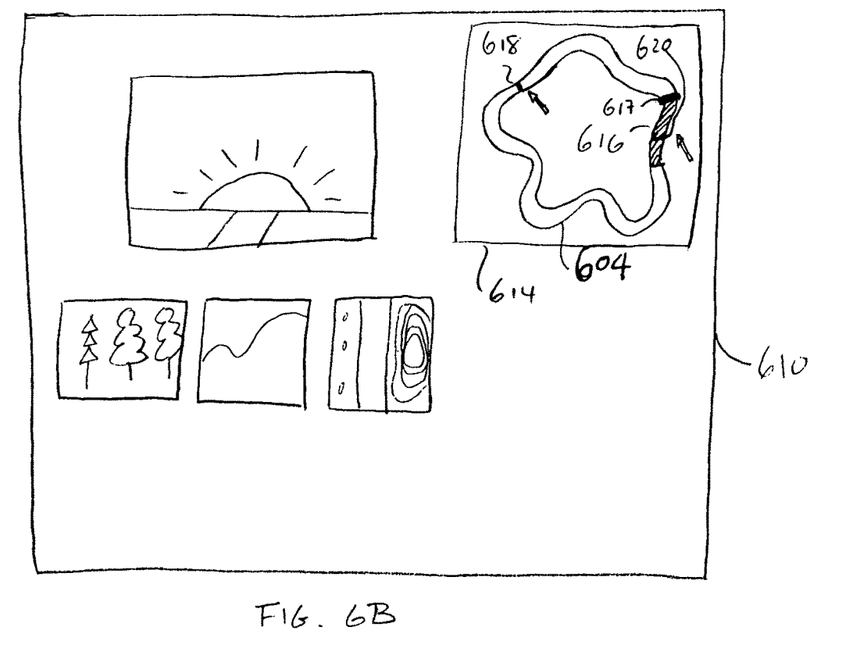
FIG. 6B is a diagram illustrating a media player embodiment that includes a control interface.

FIG. 6B is a diagram illustrating a media player embodiment that includes a control interface. In this example, an interactive media control widget 614 (also referred to as a "scrubber bar") is included in display area 610. In the given example, the scrubber bar displays location information associated with the media stream. The location information indicates one or more physical positions that correspond to the data included in the media stream. In this example, the scrubber bar shows a path 604 along which the recordings are made. In some embodiments, the path is overlaid on a map showing street names, landmarks, etc. While the media stream is played by the media player, a playhead 617 is moved along the corresponding portion of the path, and the portion of the path that corresponds to the footages played so far is highlighted. In this example, section 616 along the path is currently highlighted, indicating that the footages played so far were captured while the recorders moved along this section of the path.

The scrubber bar performs fast forward and rewind functions in response to a user selection. The user may interact with the media stream and control the playing of the media stream by selecting a specific location on the scrubber bar. In response to the user selection, the media player fast forwards or rewinds to a segment recorded at a physical position that corresponds to the user selected location. For example, if the user clicks on the scrubber bar at location 618 on the map, the media player skips ahead to play footages recorded at a physical position that corresponds to location 618. If the user then clicks on location 620, the media player rewinds and plays footages recorded at a physical position that corresponds to location 620.

The control function is implemented as follows in some embodiments: upon receiving a user input, the media player determines the GPS coordinates of the user selected location (e.g., GPS coordinates of location 618 on the map) and uses the GPS information to locate a data point (such as a video frame) captured at approximately the same time as when those GPS coordinates were taken. How to locate the appropriate data point in the stream depends on the implementation. In some embodiments, GPS information is stored in the media stream as metadata and is associates with corresponding cue points and/or key frames in the media stream. To locate the appropriate video frame, the GPS information obtained based on user selection is matched with the corresponding time, and the next cue point is selected. The media player sends a request to the server for video frames beginning at this cue point. The server complies by locating the cue point in the media stream file and sending the stream starting at the appropriate place. The media player receives and plays the received stream.

The multi-view display and the optional scrubber bar are useful for a broad range of interactive applications such as maps, driving directions, virtual tours, interactive Internet TV programming, etc. While the above examples mainly discuss applications where the recording devices are mobile, in some applications such as surveillance or sports and performances broadcasting, at least some recording devices may remain stationary and capture different camera angles/data types from one or more locations.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for displaying media information, comprising:
   receiving a first media stream that is generated based at least in part on a plurality of synchronized video recordings;
   displaying the first media stream, including by simultaneously displaying a first plurality of synchronized views including a first main view and a first set of auxiliary views, the first main view corresponding to at least one of the plurality of synchronized video recordings and at least some of the first set of auxiliary views corresponding to at least some of the plurality of synchronized video recordings;
   receiving a user selection that corresponds to a selected one of the first set of auxiliary views;
   generating a second media stream in response to the user selection and based at least in part on at least some of the plurality of synchronized video recordings;
   generating a third media stream based on the same set of recordings as the second media stream;
   displaying the second media stream, including by simultaneously displaying a second plurality of synchronized views including a second main view and a second set of auxiliary views, the second main view corresponding to the selected one of the first set of auxiliary views and the second set of auxiliary views corresponding to at least some of the plurality of synchronized video recordings; and
   displaying the third media stream, including by simultaneously displaying a third plurality of synchronized views including a third main view and a third set of auxiliary views, the third main view corresponding to the selected one of the first set of auxiliary views and the third set of auxiliary views corresponding to the plurality of synchronized video recordings of the second media stream,
   wherein the second media stream is a lower quality stream compared with the first media stream and the second media stream is displayed until the third media stream that has comparable quality as the first media stream is ready to be displayed,
   wherein said third media stream has a higher quality stream than said second media stream.

2. The method of claim 1, wherein the plurality of synchronized video recordings are synchronized at least in part by a synchronization event.

3. The method of claim 1, wherein the first main view and the first set of auxiliary views have different display resolutions.

4. The method of claim 1, wherein the first media stream, the second media stream, and the third media stream are synchronized.

5. The method of claim 1, wherein the first media stream includes a first set of cue points, the second media stream includes a second set of cue points, and the first media stream and the second media stream are synchronized using at least some of the first set of cue points and at least some of the second set of cue points.

6. The method of claim 1, further including stopping receiving the first media stream at a first cue point and beginning receiving the second media stream at a second cue point, wherein the first cue point and the second cue point are aligned in time.

7. The method of claim 1, wherein the first media stream and the second media stream require different amounts of bandwidth.

8. The method of claim 1, wherein the second media stream and the third media stream have different display resolutions.

9. The method of claim 1, wherein the plurality of synchronized video recordings includes recordings of different camera angles.

10. The method of claim 1, wherein at least some of the plurality of synchronized video recordings include different types of recorded information.

11. The method of claim 1, wherein position information associated with the plurality of synchronized video recordings is received.

12. The method of claim 1, wherein the user selection is made in a user-selectable portion of a media player.

13. The method of claim 1, wherein the user selection is made in a user-selectable portion of a media player, the user-selectable portion overlapping with at least some of the first set of auxiliary views.

14. The method of claim 1, wherein the first set of auxiliary views is arranged to display a panoramic view.

15. The method of claim 1, wherein the second media stream and the third media stream require different amounts of bandwidth.

16. The method of claim 1, wherein the second media stream is displayed until at least a portion of the third media stream is loaded and buffered.

17. A system for displaying media information, comprising:
   a processor configured to:
   receive a first media stream that is generated based at least in part on a plurality of synchronized video recordings;
   display the first media stream, including by simultaneously displaying a first plurality of synchronized views including a first main view and a first set of auxiliary views, the first main view corresponding to at least one of the plurality of synchronized video recordings and at least some of the first set of auxiliary views corresponding to at least some of the plurality of synchronized video recordings;
   receive a user selection that corresponds to a selected one of the first set of auxiliary views;
   generate a second media stream in response to the user selection and based at least in part on at least some of the plurality of synchronized video recordings;
   generate a third media stream based on the same set of recordings as the second media stream;
   display the second media stream, including by simultaneously displaying a second plurality of synchronized views including a second main view and a second set of auxiliary views, the second main view corresponding to the selected one of the first set of auxiliary views and the second set of auxiliary views corresponding to at least some of the plurality of synchronized video recordings; and
   display the third media stream, including by simultaneously displaying a third plurality of synchronized views including a third main view and a third set of auxiliary views, the third main view corresponding to the selected one of the first set of auxiliary views and the third set of auxiliary views corresponding to the plurality of synchronized video recordings of the second media stream,
   wherein the second media stream is a lower quality stream compared with the first media stream and the second media stream is displayed until the third media stream that has comparable quality as the first media stream is ready to be displayed,
   wherein said third media stream has a higher quality stream than said second media stream; and
   a memory coupled to the processor, configured to provide the processor with instructions.

18. The system of claim 17, wherein the plurality of synchronized video recordings are synchronized at least in part by a synchronization event.

19. The system of claim 17, wherein the first main view and the first set of auxiliary views have different display resolutions.

20. The system of claim 17, wherein the first media stream, the second media stream, and the third media stream are synchronized.

21. The system of claim 17, wherein the first media stream includes a first set of cue points, the second media stream includes a second set of cue points, and the first media stream and the second media stream are synchronized using at least some of the first set of cue points and at least some of the second set of cue points.

22. The system of claim 17, wherein the processor is further configured to stop receiving the first media stream at a first cue point and begin receiving the second media stream at a second cue point, wherein the first cue point and the second cue point are aligned in time.

23. The system of claim 17, wherein the first media stream and the second media stream require different amounts of bandwidth.

24. The system of claim 17, wherein the second media stream and the third media stream have different display resolutions.

25. The system of claim 17, wherein the plurality of synchronized video recordings includes recordings of different camera angles.

26. The system of claim 17, wherein at least some of the plurality of synchronized video recordings include different types of recorded information.

27. The system of claim 17, wherein the processor is further configured to receive position information associated with the plurality of synchronized video recordings.

28. The system of claim 17, wherein the user selection is made in a user-selectable portion of a media player.

29. The system of claim 17, wherein the user selection is made in a user-selectable portion of a media player, the user-selectable portion overlapping with at least some of the first set of auxiliary views.

30. The system of claim 17, wherein the first set of auxiliary views is arranged to display a panoramic view.

31. A computer program product for displaying media information, the computer program product being embodied in a non-transitory computer readable storage medium and comprising computer instructions for:
   receiving a first media stream that is generated based at least in part on a plurality of synchronized video recordings;
   displaying the first media stream, including by simultaneously displaying a first plurality of synchronized views including a first main view and a first set of auxiliary views, the first main view corresponding to at least one of the plurality of synchronized video recordings and at least some of the first set of auxiliary views corresponding to at least some of the plurality of synchronized video recordings;

receiving a user selection that corresponds to a selected one of the first set of auxiliary views;

generating a second media stream in response to the user selection based at least in part on at least some of the plurality of synchronized video recordings;

generating a third media stream that based on the same set of recordings as the second media stream;

displaying the second media stream, including by simultaneously displaying a second plurality of synchronized views including a second main view and a second set of auxiliary views, the second main view corresponding to the selected one of the first set of auxiliary views and the second set of auxiliary views corresponding to at least some of the plurality of synchronized video recordings; and displaying the third media stream, including by simultaneously displaying a third plurality of synchronized views including a third main view and a third set of auxiliary views, the third main view corresponding to the selected one of the first set of auxiliary views and the third set of auxiliary views corresponding to the plurality of synchronized video recordings of the second media stream, wherein the second media stream is a lower quality stream compared with the first media stream and the second media stream is displayed until the third media stream that has comparable quality as the first media stream is ready to be displayed, wherein said third media stream has a higher quality stream than said second media stream.

32. The computer program product of claim 31, wherein the plurality of synchronized video recordings are synchronized at least in part by a synchronization event.

33. The computer program product of claim 31, wherein the first main view and the first set of auxiliary views have different display resolutions.

34. The computer program product of claim 31, wherein the first media stream, the second media stream, and the third media stream are synchronized.

35. The computer program product of claim 31, wherein the first media stream includes a first set of cue points, the second media stream includes a second set of cue points, and the first media stream and the second media stream are synchronized using at least some of the first set of cue points and at least some of the second set of cue points.

36. The computer program product of claim 31, wherein the computer instructions further include stopping receiving the first media stream at a first cue point and beginning receiving the second media stream at a second cue point, wherein the first cue point and the second cue point are aligned in time.

37. The computer program product of claim 31, wherein the first media stream and the second media stream require different amounts of bandwidth.

38. The computer program product of claim 31, wherein the second media stream and the third media stream have different display resolutions.

39. The computer program product of claim 31, wherein the plurality of synchronized video recordings includes recordings of different camera angles.

40. The computer program product of claim 31, wherein at least some of the plurality of synchronized video recordings include different types of recorded information.

41. The computer program product of claim 31, further comprising computer instructions for receiving position information associated with the plurality of synchronized video recordings.

42. The computer program product of claim 31, wherein the user selection is made in a user-selectable portion of a media player.

43. The computer program product of claim 31, wherein the user selection is made in a user-selectable portion of a media player, the user-selectable portion overlapping with at least some of the first set of auxiliary views.

44. The computer program product of claim 31, wherein the first set of auxiliary views is arranged to display a panoramic view.

45. A method for generating media streams, comprising:
receiving a plurality of recordings; and
processing the plurality of recordings to generate a first media stream that includes content from the plurality of recordings encoded for display in a first plurality of synchronized views, a second media stream that includes content from the plurality of recordings encoded for display in a second plurality of synchronized views, and a third media stream that includes the same set of recordings as the second media stream,
wherein the first media stream, the second media stream, and the third media stream are synchronized,
wherein the second media stream is a lower quality stream compared with the first media stream and the second media stream is displayed until the third media stream that has comparable quality as the first media stream is ready to be displayed, and
wherein said third media stream has a higher quality stream than said second media stream.

46. A system for generating media streams, comprising:
a processor configured to:
receive a plurality of recordings; and
process the plurality of recordings to generate a first media stream that includes content from the plurality of recordings encoded for display in a first plurality of synchronized views, a second media stream that includes content from the plurality of recordings encoded for display in a second plurality of synchronized views, and a third media stream that includes the same set of recordings as the second media stream,
wherein the first media stream, the second media stream, and the third media stream are synchronized,
wherein the second media stream is a lower quality stream compared with the first media stream and the second media stream is displayed until the third media stream that has comparable quality as the first media stream is ready to be displayed, and
wherein said third media stream has a higher quality stream than said second media stream; and
a memory coupled to the processor and configured to provide the processor with instructions.

47. A computer program product for generating media streams, the computer program product being embodied in a non-transitory computer readable storage medium and comprising computer instructions for:
receiving a plurality of recordings; and
processing the plurality of recordings to generate a first media stream that includes content from the plurality of recordings encoded for display in a first plurality of synchronized views, a second media stream that includes content from the plurality of recordings encoded for display in a second plurality of synchronized views, and a third media stream that includes the same set of recordings as the second media stream, wherein the first media stream and the second media stream are synchronized, wherein the second media stream is a lower quality stream compared with the first media stream and the second media stream is displayed until the third media stream that has comparable quality as the first media stream is ready to be displayed, and wherein said third media stream has a higher quality stream than said second media stream.

* * * * *